D. McMILLAN.
Line-Loops.
No. 141,804.
Patented August 12, 1873.
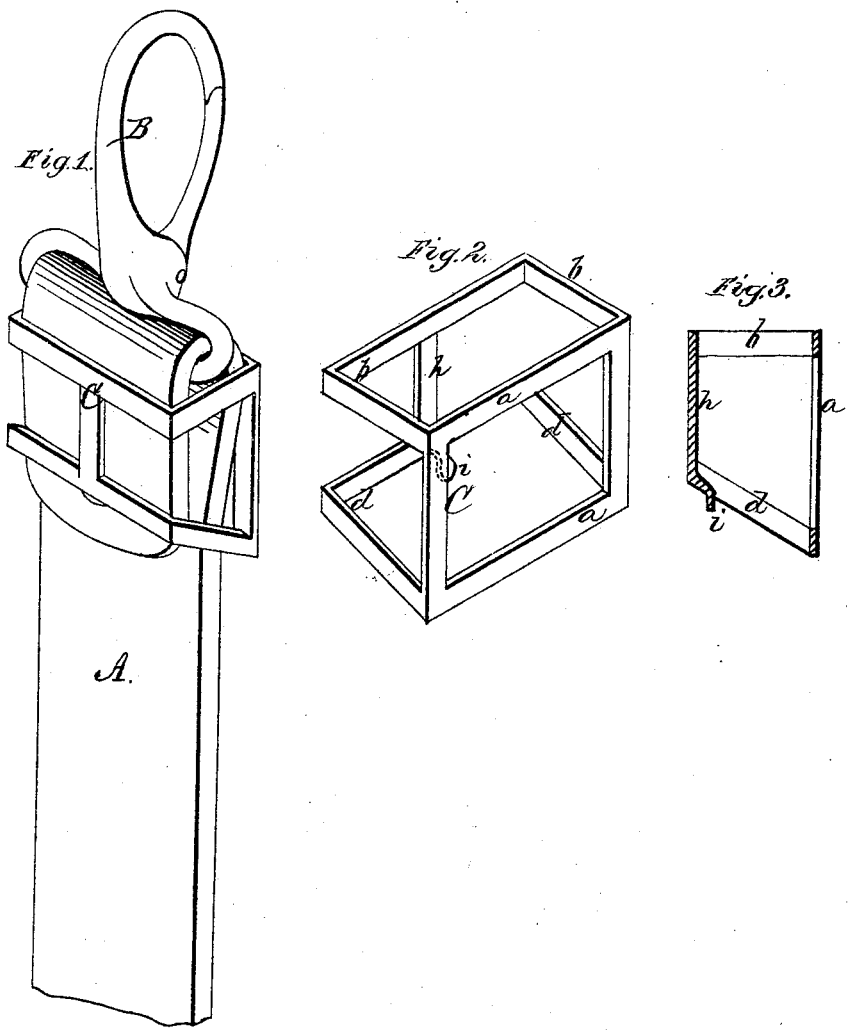
Witnesses
John A. Ellis
Wm K. Ellis
Inventor
Duncan McMillan
per
J. H. Alexander & Co.
Atty's
AM. PHOTO-LITHOGRAPHIC CO. N.Y. (OSBORNE'S PROCESS.)

UNITED STATES PATENT OFFICE.

DUNCAN McMILLAN, OF OSAGE, IOWA.

IMPROVEMENT IN LINE-LOOPS.

Specification forming part of Letters Patent No. 141,804, dated August 12, 1873; application filed March 19, 1873.

*To all whom it may concern:*

Be it known that I, D. McMILLAN, of Osage, in the county of Mitchell and State of Iowa, have invented certain new and useful Improvements in Line-Loop; and I do hereby declare that the following is a full, clear, and exact description thereof, reference being had to the accompanying drawings and to the letters of reference marked thereon, which form a part of this specification.

The nature of my invention consists in the construction and arrangement of a line-loop made of metal, to be used on the ends of lines where the snap-hook is buckled, and does away with all stitching on billets and loops.

In order to enable others skilled in the art to which my invention appertains to make and use the same, I will now proceed to describe its construction and operation, referring to the annexed drawing, in which—

Figure 1 is a perspective view, showing the end of a line with the snap-hook and my loop. Fig. 2 is a perspective view, and Fig. 3 a section, of the loop.

A represents the end of a line. B is the snap-hook, and C the metal loop. This loop consists of a frame, $a$, with another frame, $b$, extending from one edge at right angles, and another frame, $d$, extending from the other or opposite edge, but inclined toward the frame $b$. The outer bars of the two frames $b$ and $d$ are connected in the center by a short bar, $h$, having a hook, $i$, extending at one end, as shown in Fig. 3. The extreme end of the line is passed through the frames $b$ and $d$, against the frame $a$, and then passed through the loop or eye of the snap-hook B, and the end of the line then passed back through the frames $b$ and $d$ till the hook $i$ can enter a hole in the line, when the whole is firmly united and secured together.

This metal loop saves leather, and lessens the work in requiring no stitching.

I am aware that loops have been made in a tapering box form, with studs on the ring or snap end to hold the leather or strap, and I do not, broadly, claim such device; but

Having thus fully described my invention, what I claim as new, and desire to secure by Letters Patent, is—

The loop C, consisting of the frames $a\ b\ d$, bar $h$, and hook $i$, constructed specifically as described, and for the purpose set forth.

In testimony that I claim the foregoing as my own I affix my signature in presence of two witnesses.

DUNCAN McMILLAN.

Witnesses:
GEORGE A. GULLIVER,
N. L. ROOD.